United States Patent
Seo et al.

(10) Patent No.: US 7,590,391 B2
(45) Date of Patent: Sep. 15, 2009

(54) DIGITAL INTERMEDIATE FREQUENCY TRANSMITTER FOR WIRELESS COMMUNICATION

(75) Inventors: Hae-Moon Seo, Yongin (KR);
Yeon-Kug Moon, Seoul (KR);
Young-Kuk Park, Yongin (KR);
Kwang-Ho Won, Yongin (KR);
Seong-Dong Kim, Daegu (KR)

(73) Assignee: Korea Electronics Technology Institute, Kyunggi-Do (KR)

( * ) Notice: Subject to any disclaimer, the term of this patent is extended or adjusted under 35 U.S.C. 154(b) by 462 days.

(21) Appl. No.: 11/616,451

(22) Filed: Dec. 27, 2006

(65) Prior Publication Data
US 2008/0132182 A1 Jun. 5, 2008

(30) Foreign Application Priority Data
Dec. 5, 2006 (KR) .................. 10-2006-0121853

(51) Int. Cl.
*H04B 1/38* (2006.01)
*H04B 1/04* (2006.01)
*H04L 27/00* (2006.01)

(52) U.S. Cl. .............. 455/90.2; 455/118; 455/314; 375/295

(58) Field of Classification Search .......... 455/90.2, 455/102, 118, 313, 314, 323; 375/295
See application file for complete search history.

(56) References Cited

U.S. PATENT DOCUMENTS

| | | | | |
|---|---|---|---|---|
| 4,580,289 A | * | 4/1986 | Enderby | 455/314 |
| 5,519,885 A | * | 5/1996 | Vaisanen | 455/76 |
| 5,867,535 A | * | 2/1999 | Phillips et al. | 375/295 |
| 6,600,906 B1 | * | 7/2003 | Roppongi | 455/118 |
| 6,628,927 B1 | * | 9/2003 | Samuels | 455/77 |
| 6,725,019 B2 | * | 4/2004 | Higuchi | 455/84 |
| 7,184,724 B1 | * | 2/2007 | Ashby et al. | 455/130 |
| 2002/0102951 A1 | * | 8/2002 | Nakano et al. | 455/118 |
| 2002/0164965 A1 | * | 11/2002 | Chominski et al. | 455/118 |
| 2008/0291987 A1 | * | 11/2008 | Kumaki et al. | 375/224 |

* cited by examiner

*Primary Examiner*—Duc M Nguyen
(74) *Attorney, Agent, or Firm*—Edell, Shapiro & Finnan, LLC (57) ABSTRACT

A digital intermediate frequency transmitter for a wireless communication is disclosed. In accordance with the present invention, an improvement of a modulation quality such as an EVM, a linearity and a power consumption is possible, and a main characteristic of a wireless communication transmitter may be embodied at a low cost through an integration such that a high frequency 90° phase shifter, a voltage controlled oscillator having a 2× frequency or higher and a high frequency I/Q local oscillated signals are not required and a side-band signal may be effectively removed.

24 Claims, 6 Drawing Sheets

Fig. 7

DIGITAL INTERMEDIATE FREQUENCY TRANSMITTER FOR WIRELESS COMMUNICATION

RELATED APPLICATIONS

The present disclosure relates to subject matter contained in priority Korean Application No. 10-2006-0121853, filed on 5 Dec. 2006 which is herein expressly incorporated by reference in its entirety.

BACKGROUND OF THE INVENTION

1. Field of the Invention

The present invention relates to a digital intermediate frequency transmitter for a wireless communication, and in particular, to a digital intermediate frequency transmitter for a wireless communication wherein an improvement of a modulation quality such as an EVM, a linearity and a power consumption is possible, and a main characteristic of a wireless communication transmitter may be embodied at a low cost through an integration such that a high frequency 90° phase shifter, a voltage controlled oscillator having a 2× frequency or higher and a high frequency I/Q local oscillated signals are not required and a side-band signal may be effectively removed.

2. Description of Prior Art

Recently, a research on a development of a one-chip solution for reducing a power consumption of a wireless communication system is in progress.

A transmitter used in a conventional wireless communication system employs a superheterodyne method. In accordance with the superheterodyne method, a low frequency signal including an actual information such as a voice or an image is converted to an intermediate frequency signal and the intermediate frequency signal is transmitted on a carrier signal of a high frequency. The transmitter employing the superheterodyne method has a complex configuration and a large power consumption.

In order to overcome the disadvantages of the superheterodyne method, a direct conversion scheme wherein a base-band signal is up-converted to the carrier signal instead of using the intermediate frequency signal. The direct conversion scheme is advantageous in that the direct conversion scheme has a minimum power consumption of a transmitter structure of the wireless communication system, and the transmitter of the direct conversion scheme may be miniaturized and may be manufactured at a low cost.

However, in accordance with the conventional direct conversion scheme, since a quadrature signal, i.e. I and Q signals should be generated at a local oscillator, more hardware are required to carry out an accurate 90° phase shift of a high frequency signal, resulting in the large power consumption and a degradation of a modulation quality. The modulation quality refers to characteristics such as an EVM (Error Vector Magnitude), a linearity and a power consumption.

That is, in accordance with the conventional direct conversion scheme, since the quadrature signal should be generated based on a local oscillation signal, the generation of the local oscillation signal requires the accurate 90° phase shift of the high frequency signal. Therefore, the conventional direct conversion scheme is a main reason for more hardware requirement, the large power consumption and the degradation of the modulation quality.

Accordingly, a digital intermediate frequency transmitter aimed at a SDR (Software Defined Radio) which allows multiple bands is under a development as a transmitter to be used in the wireless communication system.

Figure 1:
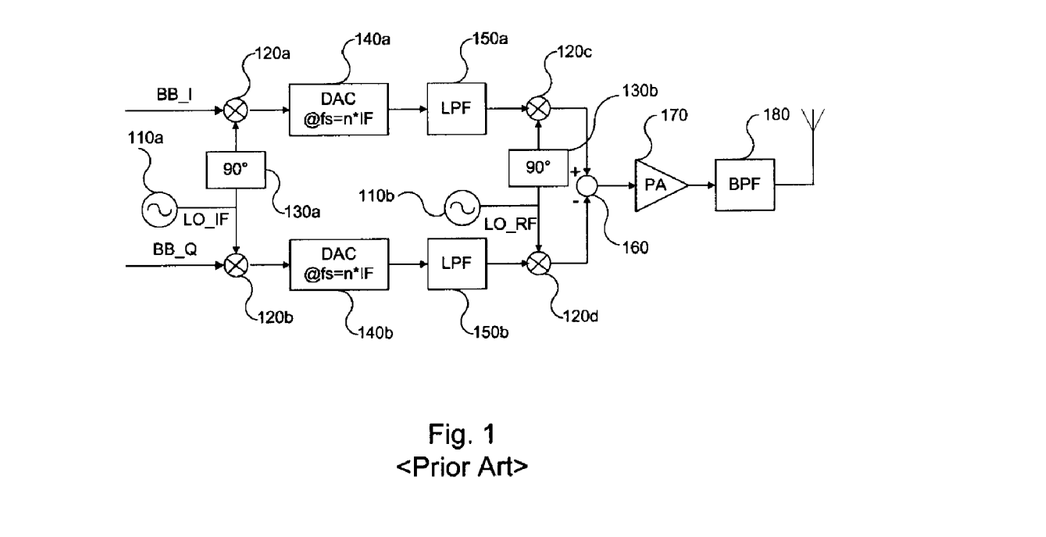
FIG. 1 is a block diagram illustrating a conventional digital intermediate frequency transmitter using an I/Q path.
Figure 2:
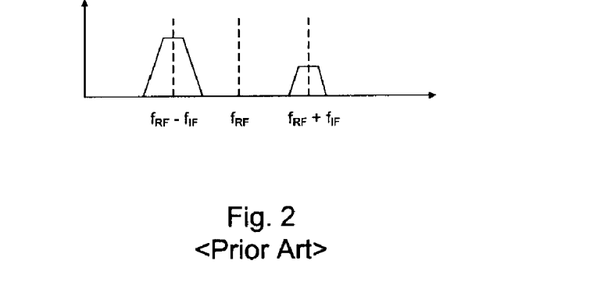
FIG. 2 is a diagram illustrating a signal in a frequency domain in the conventional digital intermediate frequency transmitter of FIG. 1.

FIGS. 1 and 2 are block diagrams illustrating a conventional digital intermediate frequency transmitter.

FIG. 1 is the block diagram illustrating a conventional digital intermediate frequency transmitter using an I/Q path.

As shown, in accordance with the conventional digital intermediate frequency transmitter using the I/Q path, base-band signals BB_I and BB_Q is mixed with a signal generated by an intermediate frequency oscillator 110 by mixers 120a and 120b to be up-converted to I/Q intermediate frequency signals in a digital domain. In this case, a signal that is shifted by 90° by a phase shifter 130a is mixed with the base-band signal BB_I.

The up-converted signals are converted to analog signals using DACs 140a and 140b.

In this case, a sampling frequency is $F_S$, which is n times the intermediate frequency (where n is an integer no less than 2).

Unwanted harmonic signals generated during the conversion in the DACs 140a and 140b are removed by low pass filters 150a and 150b.

Thereafter, an I/Q frequency up-conversion is carried out to obtain an RF transmission signal. That is, an output signal of an RF oscillator 110b is mixed with output signals of the low pass filters 150a and 150b by mixers 120c and 120d.

In addition, a phase of the output signal of the RF oscillator 110b is shifted by a phase shifter 130b to be provided to the mixer 120c.

The phase shifter 130b or a voltage controlled oscillator having a frequency 2× LO frequency to be divided may be used to generate an I/Q LO.

An undesired side-band signal may be removed by adding or subtracting the up-converted outputs of the mixers 120c and 120d through an operator 160.

After the undesired side-band signal is removed, the signal is amplified through a power amplifier 170, and is transmitted to an antennal by passing through a band pass filter 180.

FIG. 2 is a diagram illustrating a signal in a frequency domain after passing through the operator 160 in the conventional digital intermediate frequency transmitter of FIG. 1.

As shown, the side-band signal is removed by carrying out a subtraction through the operator 160.

Figure 3:
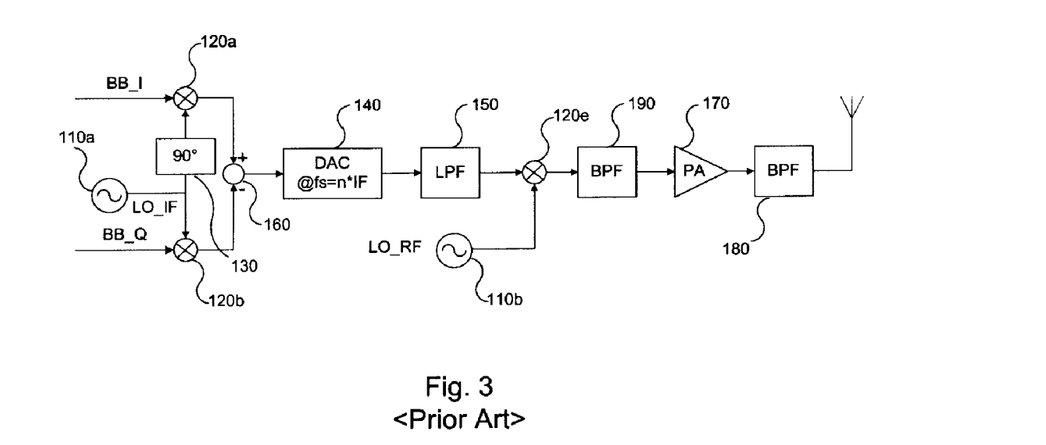
FIG. 3 is a block diagram illustrating a conventional digital intermediate frequency transmitter using a single path.

FIG. 3 is a block diagram illustrating a conventional digital intermediate frequency transmitter using a single path.

While the conventional digital intermediate frequency transmitter of FIG. 1 uses the I/Q path, the conventional digital intermediate frequency transmitter of FIG. 3 uses the single path. In addition, while the conventional digital intermediate frequency transmitter of FIG. 1 uses two phase shifters 130a and 130b, the conventional digital intermediate frequency transmitter of FIG. 3 uses only phase shifter 130 for a frequency up-conversion.

That is, after the up-conversion to the I/Q intermediate frequency using the phase shifter 130, the operation is carried out by the operator 160 and the digital signal is converted to the analog signal by a DAC 140. Thereafter, an unwanted harmonic signal generated during the conversion in the DAC 140 is removed by a low pass filter 150.

Thereafter, the frequency up-conversion is carried out by a mixer 120e in order to obtain the RF transmission signal. In addition, a filtering is carried out by a band pass filter 190 which is an external element to remove the undesired side-band signal.

Other components are similar to those of FIG. 1.

Figure 4A:
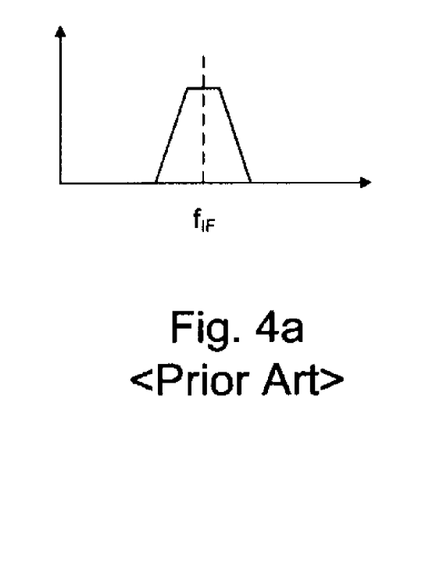
FIGS. 4a and 4b are diagrams illustrating a signal in a frequency domain in the conventional digital intermediate frequency transmitter of FIG. 3.
Figure 4B:
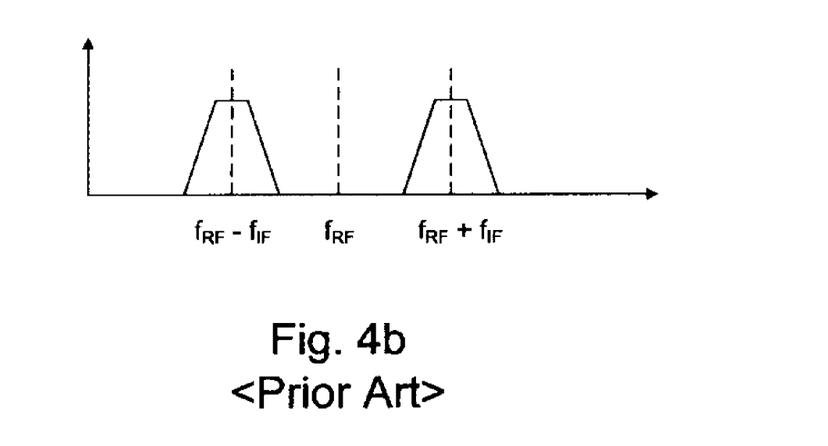

FIGS. 4a and 4b are diagrams illustrating a signal in a frequency domain in the conventional digital intermediate frequency transmitter of FIG. 3, wherein FIG. 4a illustrate the signal after passing through the operator 160 and FIG. 4b illustrates the signal after passing through the band pass filter 190.

The conventional digital intermediate frequency transmitter described with reference to FIGS. 1 through 4b has following disadvantages.

The conventional digital intermediate frequency transmitter of FIG. 1 has a problem of a mismatching of the I/Q path. Moreover, since the two DACs 140a and 140b and the two low pass filters 150a and 150b are used, the power consumption and an integration area is increased and a manufacturing cost is also increased. In addition, the conventional digital intermediate frequency transmitter of FIG. 1 is disadvantageous in generating the high frequency I/Q LO signals. The conventional digital intermediate frequency transmitter of FIG. 1 also generates an I/Q LO mismatch during the phase shift in the phase shifter 130b, and requires a large hardware resource and power consumption in order to generate accurate I/Q LO signals.

Moreover, since the conventional digital intermediate frequency transmitter of FIG. 3 uses the band pass filter 190 which is the external element, an integration is not possible, and the manufacturing cost is increased due to the high performance high frequency band pass filter 190.

SUMMARY OF THE INVENTION

It is an object of the present invention to provide a digital intermediate frequency transmitter for a wireless communication wherein an improvement of a modulation quality such as an EVM, a linearity and a power consumption is possible, and a main characteristic of a wireless communication transmitter may be embodied at a low cost through an integration such that a high frequency 90° phase shifter, a voltage controlled oscillator having a 2× frequency or higher and a high frequency I/Q local oscillated signals are not required and a side-band signal may be effectively removed.

In order to achieve the above-described object, there is provided a digital intermediate frequency transmitter for a wireless communication, comprising: an intermediate frequency up-converter for up-converting an I signal and a Q signal of a base-band based on a first intermediate frequency signal; a first operator for carrying out an operation of the up-converted I signal and the up-converted Q signal; a DA converter for converting an output signal of the first operator to an analog signal; an intermediate frequency modulator for dividing the analog signal into two signals and for modulating each of the two divided signals based on a second intermediate frequency signal; a second operator for carrying out an operation of the two modulated signals; and an RF up-converter for RF up-converting an output signal of the second operator.

In accordance with the digital intermediate frequency transmitter for the wireless communication, the intermediate frequency modulator may comprise a first intermediate frequency oscillator for outputting the first intermediate frequency signal; a phase shifter for shifting a phase of the first intermediate frequency signal by 90°; and a first mixer for mixing the I signal of the base-band with an output of the phase shifter and for mixing the Q signal of the base-band with the first intermediate frequency signal to generate output signals thereof.

In accordance with the digital intermediate frequency transmitter for the wireless communication, the first operator may subtract the up-converted Q signal from the up-converted I signal.

Preferably, the digital intermediate frequency transmitter for the wireless communication further comprises a low pass filter for removing a side-band signal from the analog signal to be transmitted to the intermediate frequency modulator.

In accordance with the digital intermediate frequency transmitter for the wireless communication, the intermediate frequency modulator may comprise a signal divider for dividing the analog signal to the two divided signals; a second intermediate frequency oscillator for outputting the second intermediate frequency signal; and a second mixer for mixing the second intermediate frequency signal with each of the two divided signals to generate output signals thereof.

In accordance with the digital intermediate frequency transmitter for the wireless communication, the intermediate frequency modulator may further comprise a first band pass filter for removing a side-band signal from one of the output signals of the second mixer.

In accordance with the digital intermediate frequency transmitter for the wireless communication, the intermediate frequency modulator may further comprise an all-pass filter for passing one of the output signals of the second mixer other than the one of the output signals of the second mixer having the side-band signal removed therefrom.

In accordance with the digital intermediate frequency transmitter for the wireless communication, the second operator may subtract one of the output signals of the second mixer from the other output signals of the second mixer.

In accordance with the digital intermediate frequency transmitter for the wireless communication, the RF up-converter may comprise a RF oscillator for generating an RF signal; and a third mixer for mixing an output signal of the second operator with the RF signal.

Preferably, the digital intermediate frequency transmitter for the wireless communication may further comprise a power amplifier for amplifying an output signal of the RF up-converter.

Preferably, the digital intermediate frequency transmitter for the wireless communication may further comprise a second band pass filter for carrying out a band-filtering an output of the power amplifier.

In accordance with the digital intermediate frequency transmitter for the wireless communication, the first intermediate frequency signal and the second intermediate frequency signal have a same frequency.

In order to achieve the above-described object, there is provided a digital intermediate frequency transmitter for a wireless communication, comprising: an intermediate frequency up-converter for up-converting an I signal and a Q signal of a base-band based on a first intermediate frequency signal; a first operator for carrying out an operation of the up-converted I signal and the up-converted Q signal; a DA converter for converting an output signal of the first operator to an analog signal; an intermediate frequency modulator for dividing the analog signal into two signals and for modulating each of the two divided signals based on a second intermediate frequency signal; a second operator for carrying out an operation of the two modulated signals; an RF up-converter for RF up-converting an output signal of the second operator; a frequency oscillator for generating an RF signal to be provided to the RF up-converter; and a frequency divider for dividing the RF signal to be provided as at least one of the intermediate frequency signal of the intermediate frequency up-converter and the second intermediate frequency signal of intermediate frequency modulator.

In accordance with the digital intermediate frequency transmitter for the wireless communication, the intermediate frequency modulator comprises a phase shifter for shifting a phase of the first intermediate frequency signal of the frequency divider by 90°; and a first mixer for mixing the I signal of the base-band with an output of the phase shifter and for mixing the Q signal of the base-band with the first intermediate frequency signal of the frequency divider to generate output signals thereof.

In accordance with the digital intermediate frequency transmitter for the wireless communication, the first operator subtracts the up-converted Q signal from the up-converted I signal.

Preferably, the digital intermediate frequency transmitter for the wireless communication may further comprise a low pass filter for removing a side-band signal from the analog signal to be transmitted to the intermediate frequency modulator.

In accordance with the digital intermediate frequency transmitter for the wireless communication, the intermediate frequency modulator comprises a signal divider for dividing the analog signal to the two divided signals; and a second mixer for mixing the second intermediate frequency signal of the frequency divider with each of the two divided signals to generate output signals thereof.

In accordance with the digital intermediate frequency transmitter for the wireless communication, the intermediate frequency modulator further comprises a first band pass filter for removing a side-band signal from one of the output signals of the second mixer.

In accordance with the digital intermediate frequency transmitter for the wireless communication, the intermediate frequency modulator further comprises an all-pass filter for passing one of the output signals of the second mixer other than the one of the output signals of the second mixer having the side-band signal removed therefrom.

In accordance with the digital intermediate frequency transmitter for the wireless communication, the second operator subtracts one of the output signals of the second mixer from the other output signals of the second mixer.

In accordance with the digital intermediate frequency transmitter for the wireless communication, the RF up-converter comprises a third mixer for mixing an output signal of the second operator with the RF signal of the frequency oscillator.

Preferably, the digital intermediate frequency transmitter for the wireless communication may further comprise a power amplifier for amplifying an output signal of the RF up-converter.

Preferably, the digital intermediate frequency transmitter for the wireless communication may further comprise a second band pass filter for carrying out a band-filtering an output of the power amplifier.

In accordance with the digital intermediate frequency transmitter for the wireless communication, the first intermediate frequency signal and the second intermediate frequency signal have a same frequency.

DETAILED DESCRIPTION OF THE INVENTION

The above-described objects and other objects and characteristics and advantages of the present invention will now be described in detail with reference to the accompanied drawings.

Figure 5:
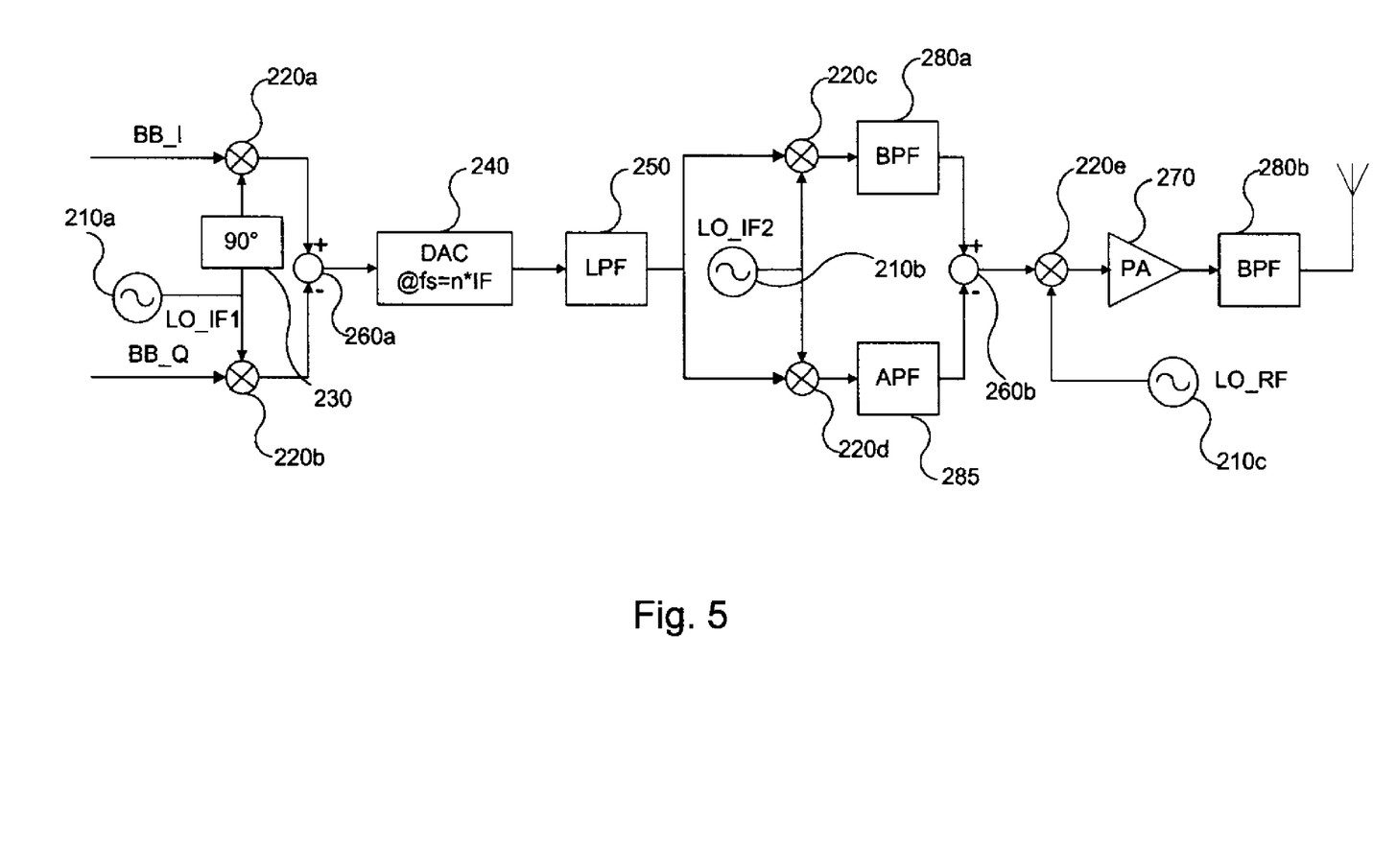
FIG. 5 is a diagram illustrating an example of a digital intermediate frequency transmitter for a wireless communication in accordance with the present invention.

FIG. 5 is a diagram illustrating an example of a digital intermediate frequency transmitter for a wireless communication in accordance with the present invention, and FIGS. 6a through 6f are diagrams illustrating a signal in a frequency domain in the digital intermediate frequency transmitter of FIG. 3 in accordance with the present invention.

As shown in FIG. 5, the digital intermediate frequency transmitter for the wireless communication in accordance with the present invention comprises a first intermediate frequency oscillator 210a, first mixer components 220a and 220b, a phase shifter 230, a first operator 260a, a DA converter 240, a low pass filter 250, a second intermediate frequency oscillator 210b, second mixer components 220c and 220d, a first band pass filter 280a, an all-pass filter 285, a second operator 260b, a third mixer 220e, an RF oscillator 210c, a power amplifier 270 and a second band pass filter 280b.

The first intermediate frequency oscillator 210a, the first mixer components 220a and 220b and the phase shifter 230 operate as an intermediate frequency up-converter.

That is, the intermediate frequency up-converter up-converts an I signal and a Q signal of a base-band based on a first intermediate frequency signal.

More specifically, the first intermediate frequency oscillator 210a which is a local oscillator outputs the first intermediate frequency signal.

The phase shifter 230 shifts a phase of the first intermediate frequency signal by 90°.

The first mixer components 220a and 220b respectively mixes the I signal of the base-band with an output of the phase shifter 230 and the Q signal of the base-band with the first intermediate frequency signal to generate output signals thereof.

As described above, the I signal and the Q signal of the base-band are up-converted to signals having a first intermediate frequency in a digital domain.

The first operator 260a carries out an operation of the outputs of the intermediate frequency up-converter, i.e. the up-converted I signal and the up-converted Q signal.

More specifically, the first operator 260a may subtract an output of the first mixer component 220b, i.e. the up-converted Q signal from the up-converted I signal.

Figure 6A:
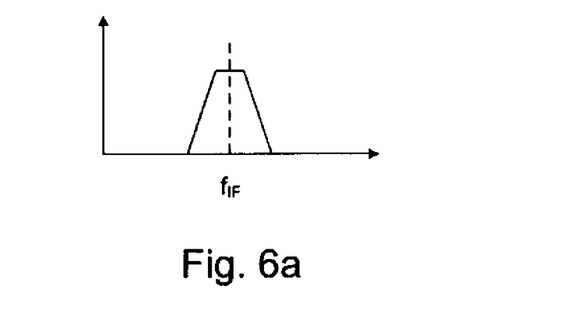
FIGS. 6a through 6f are diagrams illustrating a signal in a frequency domain in the digital intermediate frequency transmitter of FIG. 3 in accordance with the present invention.

FIG. 6a is the diagram illustrating the signal in the frequency domain for an output signal of the first operator 260a. As shown, the I signal and the Q signal of the base-band are up-converted to signals having an intermediate frequency $f_{IF}$.

In this case, the output signal of the first operator 260a wherein the up-converted Q signal is subtracted from the up-converted I signal may be expressed as equation 1.

$$\begin{aligned}\cos(W_{IF}t)\cos(W_{BB}t) - \sin(W_{IF}t)\sin(W_{BB}t) = \\ \cos[(W_{IF} + W_{BB})t] + \cos[(W_{IF} - W_{BB})t] - \\ \cos[(W_{IF} - W_{BB})t] + \cos[(W_{IF} + W_{BB})t] = \\ 2\cos[(W_{IF} + W_{BB})t]\end{aligned}$$ [Equation 1]

The DA converter 240 converts the output signal of the first operator 260a to an analog signal. In this case, a sampling frequency is $F_S$, which is n times the first intermediate frequency (where n is an integer no less than 2).

Figure 6B:
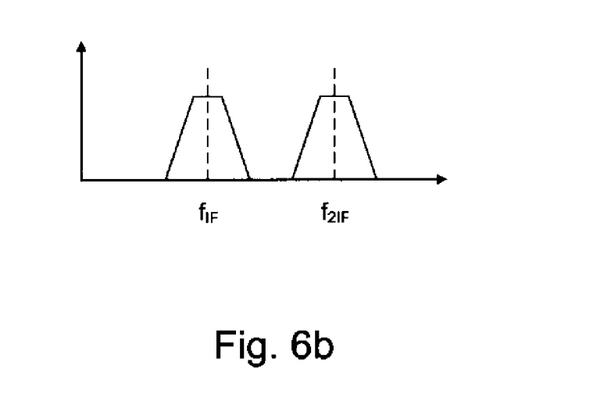

FIG. 6b is the diagram illustrating the signal in the frequency domain for an output signal of the DA converter 240. As shown, signals are distributed at frequencies which is n times the intermediate frequency $f_{IF}$.

Preferably, the analog signal is then removed of a side-band signal through the low pass filter 250.

Figure 6C:
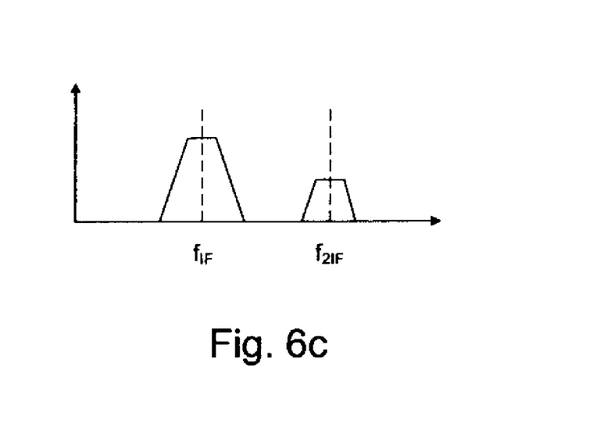

FIG. 6c is the diagram illustrating the signal in the frequency domain for an output signal of the low pass filter 250. As shown, an unnecessary harmonics component is removed.

Thereafter, an intermediate frequency modulation base on a second intermediate frequency is carried out.

The second intermediate frequency oscillator 210b, the second mixer components 220c and 220d, the first band pass filter 280a and the all-pass filter 285 operate as an intermediate frequency modulator.

That is, the output signal of the DA converter 240, preferably an output signal of the low pass filter 250 having the side-band signal removed thereof is divided into two signals, and each of the divided two signals is modulated based on a second intermediate frequency signal.

More specifically, a signal divider divides the analog signal which is the output signal of the DA converter 240 to the two divided signals. The division of signal may be carried out after the low pass filter 250 of FIG. 5 through a signal wiring.

The second intermediate frequency oscillator 210b outputs the second intermediate frequency signal through a local oscillation.

While a configuration wherein the second intermediate frequency oscillator 210b is separately included is possible, a configuration wherein the first intermediate frequency signal and the second intermediate frequency signal have a same frequency is also possible. In this case, the second intermediate frequency oscillator 210b may be substituted by the first intermediate frequency oscillator 210a. The substitution of the second intermediate frequency oscillator 210b may improve an efficient integration.

The second mixer components 220c and 220d mix the second intermediate frequency signal with each of the two divided signals to generate output signals thereof.

That is, while the conventional digital intermediate frequency transmitter includes a separate phase shifter for the intermediate frequency modulation, the digital intermediate frequency transmitter of the present invention does not require the separate phase shifter for the intermediate frequency modulation.

Figure 6D:
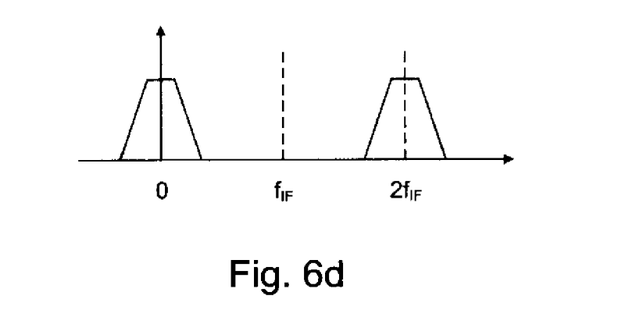

FIG. 6d is the diagram illustrating the signal in the frequency domain for an output signal of the second mixer 220c or 220d of the second mixer components 220c and 220d, wherein the first intermediate frequency and the second intermediate frequency are assumed to be the same.

In this case, the output signal of the mixer 220c or 220d may be expressed as equation 2.

$$\begin{aligned}\cos[(W_{IF} + W_{BB})t]\cos(W_{IF}t) = \\ \cos[(2W_{IF} + W_{BB})t] + \cos(W_{BB}t)\end{aligned}$$ [Equation 2]

In addition, the first band pass filter 280a is disposed so as to remove the side-band signal from one of the output signals of the second mixer components 220c and 220d. That is, the first band pass filter 280a removes the side-band signal from the output signal of the mixer 220c as shown.

In addition, the all-pass filter 285 is disposed so as to pass one of the output signals of the second mixer components 220c and 220d. The all-pass filter 285 passes one of the output signals of the second mixer other than the one of the output signals of the second mixer having the side-band signal removed therefrom. For instance, the first band pass filter 280a passes the output signal of the mixer 220d as shown.

The second operator 260b carries out an operation of the two modulated signals modulated to the intermediate frequency by the intermediate frequency modulator.

For instance, the second operator 260b may be configured to subtract one of the output signals of the second mixer components 220c and 220d from the other output signals of the second mixer components 220c and 220d.

Through such process, the modulated signal having a zero frequency as a carrier frequency may be generated.

Figure 6E:
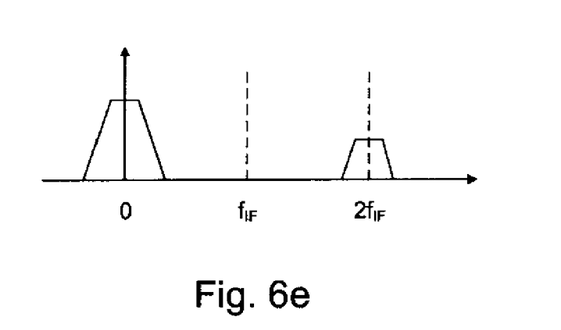

FIG. 6e is the diagram illustrating the signal in the frequency domain for an output signal of the second operator 260b, wherein the first intermediate frequency and the second intermediate frequency are assumed to be the same.

The third mixer 220e and the RF oscillator 210c operate as an RF up-converter.

That is, the RF up-converter up-converts the output signal of the second operator 260b.

The RF oscillator 210c generates an RF signal.

The third mixer 220e mixes the output signal of the second operator 260b with the RF signal of the RF oscillator 210c.

Figure 6F:
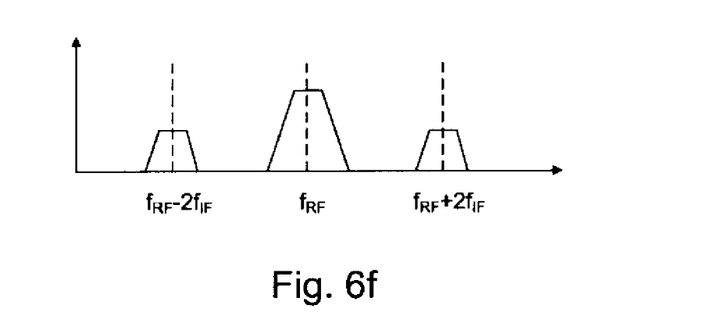

FIG. 6f is the diagram illustrating the signal in the frequency domain for an output signal of the third mixer 220e, wherein the first intermediate frequency and the second intermediate frequency are assumed to be the same.

In this case, the output signal of the third mixer 220e may be expresses as equation 3.

$$\begin{aligned}\cos[(W_{BB}t)\cos(W_{RF}t) = \\ \cos[(W_{RF} + W_{BB})t] + \cos[(W_{RF} - W_{BB})t]\end{aligned}$$ [Equation 3]

The power amplifier 270 amplifies an output signal of the RF up-converter, i.e. the output signal of the third mixer 220e. The second band pass filter 280b carries out a band-filtering of an output of the power amplifier 270.

The signal is then transmitted through an antenna.

The digital intermediate frequency transmitter for the wireless communication described with reference to FIG. 5 does not employ a phase shifting for the RF signal or an external high performance band pass filter so that a power consumption is minimized and an integration and a reduction of a manufacturing cost is facilitated. In addition, when the first intermediate frequency signal and the second intermediate frequency signal are the same, the number of oscillators such as a voltage controlled oscillator may be minimized to minimize the power consumption and facilitate the integration and the reduction of the manufacturing cost.

Figure 7:
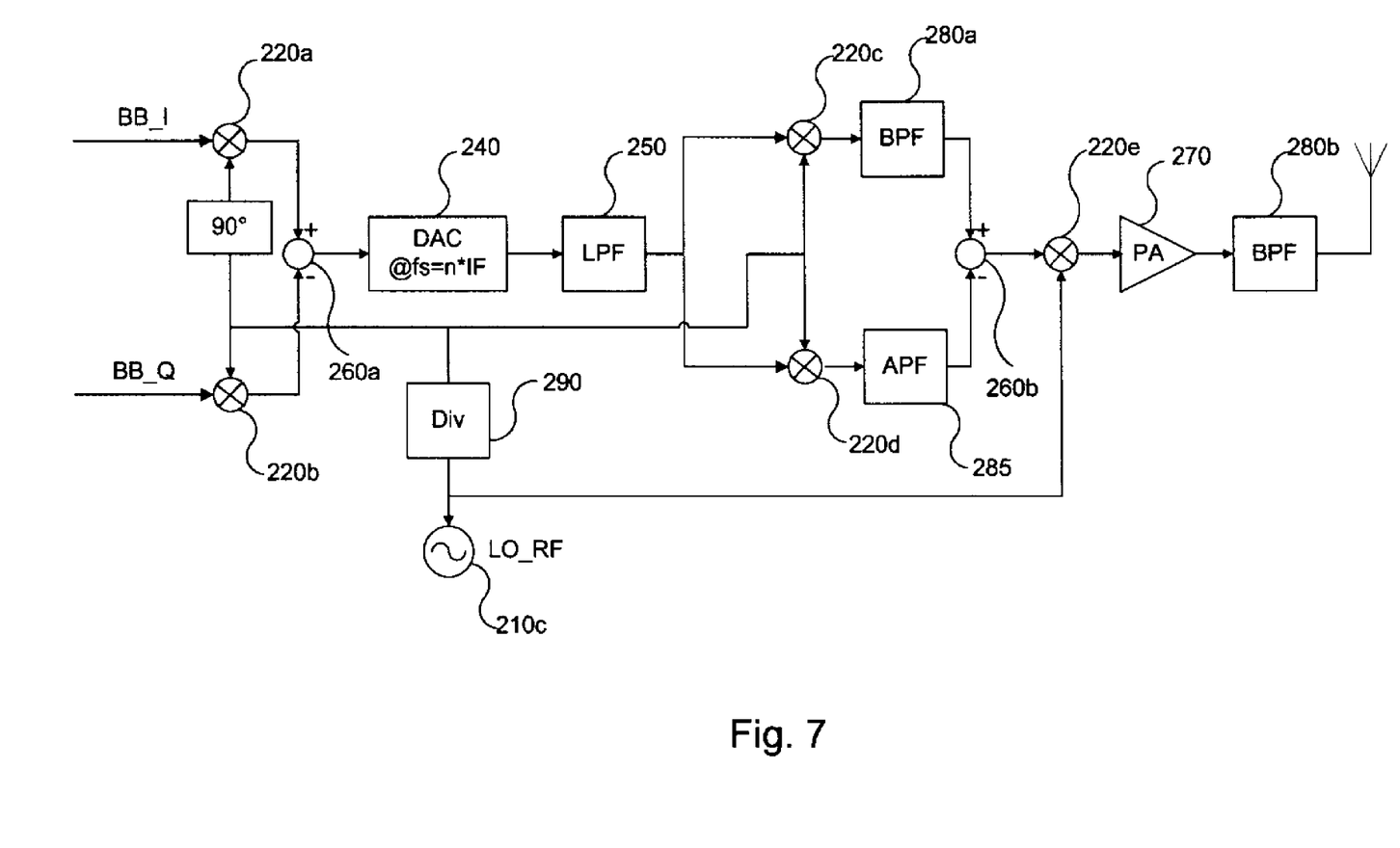
FIG. 7 is a diagram illustrating another example of a digital intermediate frequency transmitter for a wireless communication in accordance with the present invention.

FIG. 7 is a diagram illustrating another example of a digital intermediate frequency transmitter for a wireless communication in accordance with the present invention.

As shown, the digital intermediate frequency transmitter for the wireless communication is similar to that of FIG. 5 except an oscillation configuration. Therefore, a description will be focused on the oscillation configuration.

As shown, the digital intermediate frequency transmitter for the wireless communication of FIG. 7 provides the first intermediate frequency signal, the second intermediate frequency signal and the RF signal using the RF oscillator 210c and a frequency divider 290.

The RF oscillator 210c generates the RF signal for the RF up-conversion.

The frequency divider 290 divides the RF signal of the RF oscillator 210c to be provided as at least one of the intermediate frequency signal of the intermediate frequency up-converter and the second intermediate frequency signal of intermediate frequency modulator.

Through such configuration, the number of oscillators such as the voltage controlled oscillator may be minimized to minimize the power consumption and facilitate the integration and the reduction of the manufacturing cost.

While the present invention has been particularly shown and described with reference to the preferred embodiment thereof, it will be understood by those skilled in the art that various changes in form and details may be effected therein without departing from the spirit and scope of the invention as defined by the appended claims.

As described above, in accordance with the present invention, an improvement of a modulation quality such as an EVM, a linearity and the power consumption is possible, and a main characteristic of a wireless communication transmitter may be embodied at a low cost through the integration such that a high frequency 90° phase shifter, the voltage controlled oscillator having a 2× frequency or higher and a high frequency I/Q local oscillated signals are not required and the side-band signal may be effectively removed.

What is claimed is:

1. A digital intermediate frequency transmitter for a wireless communication, comprising:
    an intermediate frequency up-converter for up-converting an I signal and a Q signal of a base-band based on a first intermediate frequency signal;
    a first operator for carrying out an operation of the up-converted I signal and the up-converted Q signal;
    a DA converter for converting an output signal of the first operator to an analog signal;
    an intermediate frequency modulator for dividing the analog signal into two signals and for modulating each of the two divided signals based on a second intermediate frequency signal;
    a second operator for carrying out an operation of the two modulated signals; and
    an RF up-converter for RF up-converting an output signal of the second operator.

2. The transmitter in accordance with claim 1, wherein the intermediate frequency modulator comprises:
    a first intermediate frequency oscillator for outputting the first intermediate frequency signal;
    a phase shifter for shifting a phase of the first intermediate frequency signal by 90°; and
    a first mixer for mixing the I signal of the base-band with an output of the phase shifter and for mixing the Q signal of the base-band with the first intermediate frequency signal to generate output signals thereof.

3. The transmitter in accordance with claim 1, wherein the first operator subtracts the up-converted Q signal from the up-converted I signal.

4. The transmitter in accordance with claim 1, further comprising a low pass filter for removing a side-band signal from the analog signal to be transmitted to the intermediate frequency modulator.

5. The transmitter in accordance with claim 1, wherein the intermediate frequency modulator comprises:
    a signal divider for dividing the analog signal to the two divided signals;
    a second intermediate frequency oscillator for outputting the second intermediate frequency signal; and
    a second mixer for mixing the second intermediate frequency signal with each of the two divided signals to generate output signals thereof.

6. The transmitter in accordance with claim 5, wherein the intermediate frequency modulator further comprises a first band pass filter for removing a side-band signal from one of the output signals of the second mixer.

7. The transmitter in accordance with claim 6, wherein the intermediate frequency modulator further comprises an all-pass filter for passing one of the output signals of the second mixer other than the one of the output signals of the second mixer having the side-band signal removed therefrom.

8. The transmitter in accordance with claim 5, wherein the second operator subtracts one of the output signals of the second mixer from the other output signals of the second mixer.

9. The transmitter in accordance with claim 1, wherein the RF up-converter comprises:
    a RF oscillator for generating an RF signal; and
    a third mixer for mixing an output signal of the second operator with the RF signal.

10. The transmitter in accordance with claim 1, further comprising a power amplifier for amplifying an output signal of the RF up-converter.

11. The transmitter in accordance with claim 10, further comprising a second band pass filter for carrying out a band-filtering an output of the power amplifier.

12. The transmitter in accordance with claim 1, wherein the first intermediate frequency signal and the second intermediate frequency signal have a same frequency.

13. The transmitter in accordance with claim 1, wherein the intermediate frequency modulator comprises:
    a signal divider for dividing the analog signal to the two divided signals; and
    a second mixer for mixing the second intermediate frequency signal of the frequency divider with each of the two divided signals to generate output signals thereof.

14. The transmitter in accordance with claim 13, wherein the intermediate frequency modulator further comprises a first band pass filter for removing a side-band signal from one of the output signals of the second mixer.

15. The transmitter in accordance with claim 14, wherein the intermediate frequency modulator further comprises an all-pass filter for passing one of the output signals of the second mixer other than the one of the output signals of the second mixer having the side-band signal removed therefrom.

16. The transmitter in accordance with claim 13, wherein the second operator subtracts one of the output signals of the second mixer from the other output signals of the second mixer.

17. A digital intermediate frequency transmitter for a wireless communication, comprising:
- an intermediate frequency up-converter for up-converting an I signal and a Q signal of a base-band based on a first intermediate frequency signal;
- a first operator for carrying out an operation of the up-converted I signal and the up-converted Q signal;
- a DA converter for converting an output signal of the first operator to an analog signal;
- an intermediate frequency modulator for dividing the analog signal into two signals and for modulating each of the two divided signals based on a second intermediate frequency signal;
- a second operator for carrying out an operation of the two modulated signals;
- an RF up-converter for RF up-converting an output signal of the second operator;
- a frequency oscillator for generating an RF signal to be provided to the RF up-converter; and
- a frequency divider for dividing the RF signal to be provided as at least one of the intermediate frequency signal of the intermediate frequency up-converter and the second intermediate frequency signal of intermediate frequency modulator.

18. The transmitter in accordance with claim 17, wherein the intermediate frequency modulator comprises:
- a phase shifter for shifting a phase of the first intermediate frequency signal of the frequency divider by 90°; and
- a first mixer for mixing the I signal of the base-band with an output of the phase shifter and for mixing the Q signal of the base-band with the first intermediate frequency signal of the frequency divider to generate output signals thereof.

19. The transmitter in accordance with claim 17, wherein the first operator subtracts the up-converted Q signal from the up-converted I signal.

20. The transmitter in accordance with claim 17, further comprising a low pass filter for removing a side-band signal from the analog signal to be transmitted to the intermediate frequency modulator.

21. The transmitter in accordance with claim 17, wherein the RF up-converter comprises:
- a third mixer for mixing an output signal of the second operator with the RF signal of the frequency oscillator.

22. The transmitter in accordance with claim 17, further comprising a power amplifier for amplifying an output signal of the RF up-converter.

23. The transmitter in accordance with claim 22, further comprising a second band pass filter for carrying out a band-filtering an output of the power amplifier.

24. The transmitter in accordance with claim 17, wherein the first intermediate frequency signal and the second intermediate frequency signal have a same frequency.

* * * * *